(12) United States Patent
Wong et al.

(10) Patent No.: US 9,239,802 B1
(45) Date of Patent: Jan. 19, 2016

(54) SYSTEM AND METHOD FOR PROTECTING A PLUG SERVER USING ENCRYPTION TECHNIQUES WITHOUT INTERNET CONNECTIVITY

(71) Applicants: Sze Yuen Wong, Herndon, VA (US); Amol Kedar, Herndon, VA (US)

(72) Inventors: Sze Yuen Wong, Herndon, VA (US); Amol Kedar, Herndon, VA (US)

( * ) Notice: Subject to any disclaimer, the term of this patent is extended or adjusted under 35 U.S.C. 154(b) by 0 days.

(21) Appl. No.: 14/484,359

(22) Filed: Sep. 12, 2014

(51) Int. Cl.
  *G06F 21/00* (2013.01)
  *G06F 12/14* (2006.01)
  *G06F 21/12* (2013.01)
  *G06F 21/62* (2013.01)

(52) U.S. Cl.
  CPC ........ *G06F 12/1466* (2013.01); *G06F 12/1408* (2013.01); *G06F 21/123* (2013.01); *G06F 21/62* (2013.01); *G06F 2212/1052* (2013.01)

(58) Field of Classification Search
  None
  See application file for complete search history.

(56) References Cited

U.S. PATENT DOCUMENTS

| | | | | |
|---|---|---|---|---|
| 8,189,769 B2* | 5/2012 | Ramasamy | ........... | H04L 9/0637 380/28 |
| 8,559,630 B2* | 10/2013 | Ramasamy | ........... | H04L 9/0637 380/28 |
| 2007/0011469 A1* | 1/2007 | Allison | ............... | G06F 21/6209 713/193 |
| 2011/0252243 A1* | 10/2011 | Brouwer | ............... | H04L 9/0894 713/189 |
| 2013/0227694 A1* | 8/2013 | Weinstein | ............. | G06F 21/577 726/25 |
| 2013/0339971 A1* | 12/2013 | Boland | ................. | G06F 9/4881 718/104 |
| 2015/0242400 A1* | 8/2015 | Bensberg | ............ | G06F 17/3051 707/615 |

* cited by examiner

*Primary Examiner* — Hadi Armouche
*Assistant Examiner* — Andrew Steinle

(57) ABSTRACT

Various systems, computer program products, and methods for securing a plug server and its data are described. According to the invention, the plug server will be protected via encryption when disconnected from the internet via a block level encryption device. The invention is particularly useful in environments where no internet connectivity exists, and teams must collaborate and collect data in remote regions of the world in a secure responsible manner.

3 Claims, 4 Drawing Sheets

SYSTEM AND METHOD FOR PROTECTING A PLUG SERVER USING ENCRYPTION TECHNIQUES WITHOUT INTERNET CONNECTIVITY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The disclosure relates to systems, devices, and methods for protecting a plug server and said data on a plug server without internet connectivity.

BACKGROUND OF THE INVENTION

Presently the plug server is widely used in different parts of the world as a replacement to the heavy computing machines that the cloud computing offers or the highly scalable machines in the data center. This also adds to a lot of onus on protecting the data stored within the plug server. The plug server only has a username/password login mechanism to securely get access to the data stored on it.

The data from one plug server can be physically swapped into another plug server and made readable to the end user. This makes it vulnerable to theft or even damaging the data stored on the plug.

Though there exists solutions to address the problem of protecting the data at rest on the physical server or a virtual machine which is always connected to the internet, that mechanism involves having a key server which is always connected to the internet as well and ideally located in the same data center as the Virtual Machine. There is also a solution as mentioned in Publication number: WO2014042512 A1 titled 'Management of storage encryption over network-based elastic block store volume', which describes the protecting the data stored on a cloud based block store, but there is no solution that discusses the use of a physical key to securely decrypt the data stored on a plug server when it is disconnected from the internet, and make the data usable to the user.

Therefore, there is a need for a solution that will encrypt the data as it is stored on the plug server and then upon presenting the right set of decryption keys it can then securely decrypt the data during the plug server startup process without the plug being connected to the internet.

Furthermore, this solution should also withstand attacks external users who can clone the key file into another new key file by cloning the keys and using them to access the data on the plug server. This will then make the plug secure against any sort of theft as well as if the plug server is stolen in the field of use, it can still keep the data secure as it cannot be read without the correct set of key files.

SUMMARY OF THE INVENTION

Systems, devices, and methods that facilitate the protection of a plug server and data on said plug server without network connectivity A first aspect of the present invention is to provide a method to secure and protect the data on a plug server in an environment with no internet e.g rural parts of Africa, Asia, etc., by using a block device level encryption mechanism and a physical key to decrypt the data.

A second aspect of the present invention is to provide a system for securing the physical key file by locking it to certain hardware attributes which deters an attacker/hacker from making copies or cloning the key in the field.

DETAILED DESCRIPTION OF THE INVENTION

Figure 1:
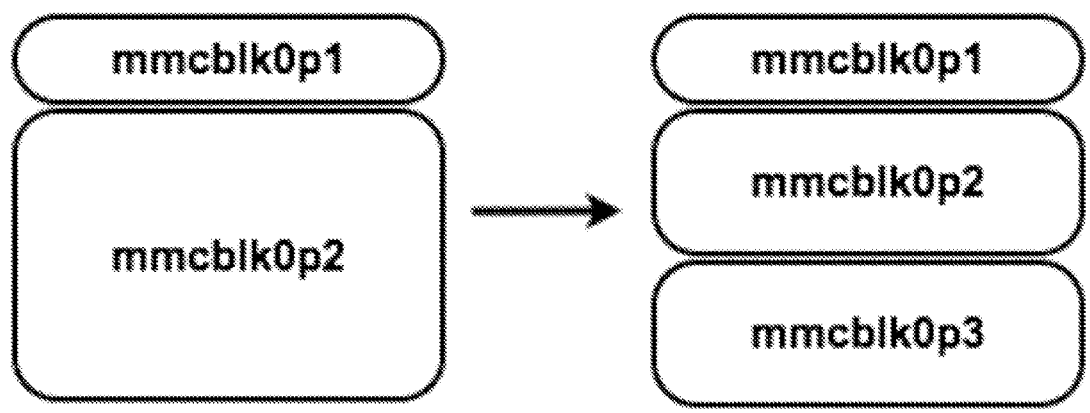
FIG. 1 is a schematic of the storage partitioning process, in order to store the newly encrypted files.

The present invention provides a method and system to secure and protect the data stored on the plug server. A plug server is a computing device designed for general purpose computing needs. The core architecture is based on the ARM/Intel based processors with expandable memory slots, storage and low power consumption. The plug server is a very good alternative to the bulky server in the data center or in the cloud environment due to its low computing/processing needs.

The biggest and most important benefit of the plug server is, its ability to create an access point network from the device. This enables other devices with wifi capabilities that are in the close proximity of the plug server to connect to the said access point via wireless network and read and write data to the application installed on the plug server.

This makes the plug very useful where there is no internet and it can be used as a standalone server for large applications with needs for multiple smaller mobile devices connect and interact with the plug. The low power consumption makes the plug server handy to run even on smaller solar battery packs, making the electricity needs trivial. All these features together makes the plug server a great boon to computing in the 'disconnected' part of the world.

The plug storage has an eMMC flash disk with kernel and root file system. During our encryption process we will install the decryption key on an externally connected usb device, so that it becomes the only key to access the data securely thats stored on the plug. So if the decryption key is not present during the bootup process, it disables any read and or write I/O operations on the data, and if the key is present during boot up process, it is used to decrypt the data and safely mount it to a usable disk volume.

The original plug storage has 2 partitions, one for the root file system that contains all the applications data files and software needed to run the application and the other for the kernel modules needed to load up the Operating system for the plug server. For our encryption mechanism to work we have added an additional partition to the storage disk. This portion of the disk will be used to store the encrypted data based on the LUKS block level encryption and will need a key file to decrypt the data.

To begin with the encryption process, we first have to connect to the plug using the serial port connector hardware and the FTDI drivers and change the plug internal environment to change the boot sequence of the plug, allowing us to boot the plug from an external usb device. This usb device has 2 partitions as well one for kernel image and the other for root file system.

Once the boot sequence is modified, and the plug is starts, we have a clean boot process for the plug into an external device. This lets us now modify the plugs internal data partitions enabling us to start the process to create the third partition. As the plug server completes the startup process, it initially has 2 partitions for e.g. mmcblk0p1 and mmcblk0p2.

We create an additional third partition for e.g. mmcblk0p3, for storing the secure data files. So the mmcblk0p1 partition is formatted using the msdos filesystem which stores the kernel modules on it, while the mmcblk0p2 partition and mmcblk0p3 partition are formatted using the ext4 file system as shown in FIG. 1. The root filesystem is stored on mmcblk0p2 partition while mmcblk0p3 partition will be used for storing encrypted application data.

Using ext4 has multiple advantages, it supports a large filesystem, extents are used for storing data which replaces block mapping from previous generations of file system, it has a highly efficient journal checksumming process, and it also gives faster performance.

Based on the research we know that Linux supports two types of encryption mechanisms, file system stacked level and block device level. Choices among encryption techniques can involve tradeoffs between the degree of security and the data processing demands to implement the encryption.

A brief description of the encryption methodologies is cited in U.S. Pat. No. 8,189,769, titled "Systems and methods for encrypting data", in which the author describes optimum method to encrypt contiguous alignment of data blocks. Some examples of file system stacked level encryption are eCryptfs and EncFS, whereas for block device level encryption we have loop-AES, TrueCrypt and LUKS.

We use the Linux Unified Key Setup on disk format (LUKS). It was designed according to TKS1, a template design developed in TKS1 for secure key setup. LUKS closely resembles the structure recommended in the TKS1 paper, but also adds metadata for cipher setup management and LUKS also supports multiple keys/passphrases. It is used to conveniently set up disk encryption based on the dm-crypt kernel module.

The dm-crypt kernel module works at the block device level, enabling users to do transparent encryption of block devices using the kernel crypto API. The module uses the key to encrypt the block device data. DM-Crypt encrypts the so-called backing device (the physical disk) and uses a virtual block device to provide access to the cleartext content below /dev/mapper.

We specify one of the symmetric ciphers, an encryption mode, a key (of any allowed size), an iv generation mode and then the user can create a new block device in /dev. Writes to this device will be encrypted and reads need to be decrypted by passing a key. The filesystem can be mounted on it as usual or it stack the dm-crypt device with another device like RAID or LVM volume.

Figure 2:
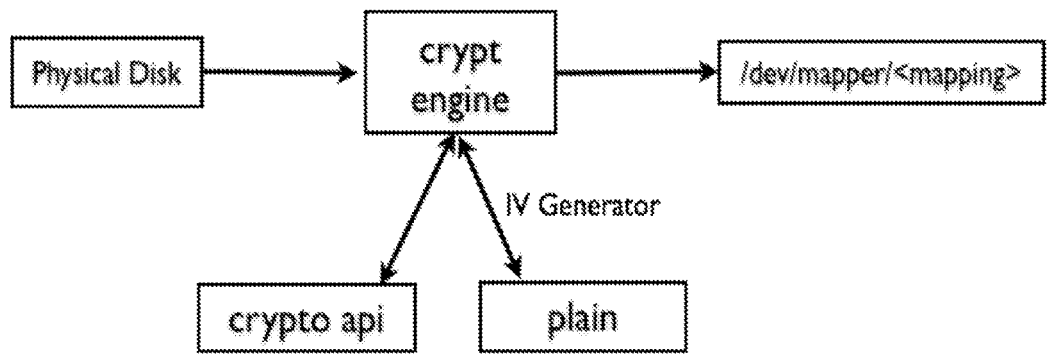
FIG. 2 depicts how the crypt engine algorithm creates a encrypted disk from a plain physical device

Typing up to 32 hex characters from memory may not be easy, but cryptsetup can help. cryptsetup is a tool that generates a cryptographic key from a passphrase, then passes the key to the kernel. Cryptsetup is the utility used very closely with LUKS, for setting up encrypted filesystems using Device Mapper and the dm-crypt target. LUKS defines a header for DM-Crypt partitions. As shown in FIG. 2 the two important cryptsetup features can be parametrized: key generation and encryption.

The former that will generate a key from the supplied password. This defaults to a hash algorithm, which gives the user the freedom of selecting a password of any length. The hash will compress the information to provide a fixed number of bytes. Two parameters need to be selected for the encryption process: the algorithm and the mode. cryptsetup passes these parameters and the derived key to the kernel, and the DM-Crypt module coordinates the procedure, using the Crypto-API to handle encryption.

Now we configure the LUKS file system partition by initializing the volume and setting initial key and passphrase, Once that is done we create a mapping using the kernel device-mapper, so that the device's decrypted contents could be accessed. There should now be a device node, /dev/mapper/<name>, which represents the decrypted device. This block device can be read from and written to like any other unencrypted block device.

Figure 3:
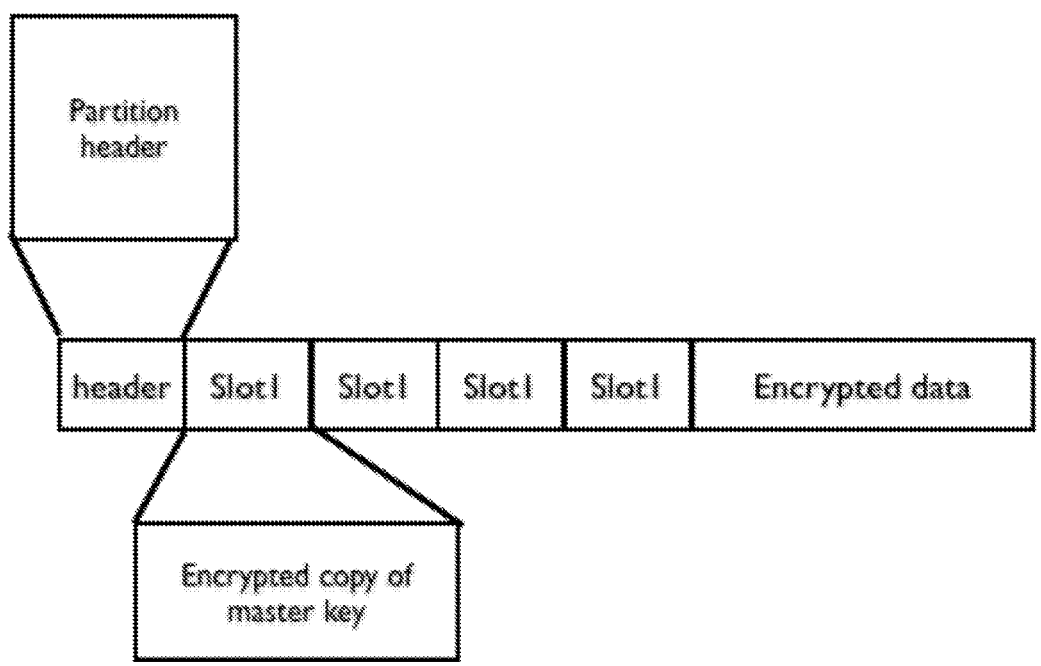
FIG. 3 shows the LUKS encryption policy.

The following FIG. 3 shows how the LUKS stores the encrypted master key in the partition header to support multiple passwords for a single partition. LUKS can store multiple, equivalent copies of the master key and encrypt each one of them with a different string.

Now we need to format the LUKS partition by allocating zeros to the /dev/mapper/<name> encrypted device. This will allocate block data with zeros. This ensures that outside world will see this as random data i.e. it protect against disclosure of data usage patterns.

Since we have to mount this new device to the filesystem we format it with ext4 filesystem and mount it to a local directory on the plug server. This will be the place to store all the files and data that needs to be secured. Once the device is mounted we start moving the web server files along with the database and the application data stored in /var/www location into the newly encrypted mount point and create soft links back to the respective locations.

Now that we have encrypted the device and moved the desired files to the mount point, we need a way to decrypt them for making them readable, this will allow our application installed on plug server to function seamlessly with the encrypted partition.

To access the encrypted block device we need to generate a multi bit key using the pseudo-random algorithm and add it to the available key slot on the encrypted device. We have an option to add multiple keys during this key generation process.

These keys have to be transferred onto an external mounted device e.g usb key, which will be connected to the plug during the reboot process. This external device will be used to mount and unmount the encrypted partition on the plug server, therein making it difficult for anyone to get direct access to the data without the key file.

Figure 4:
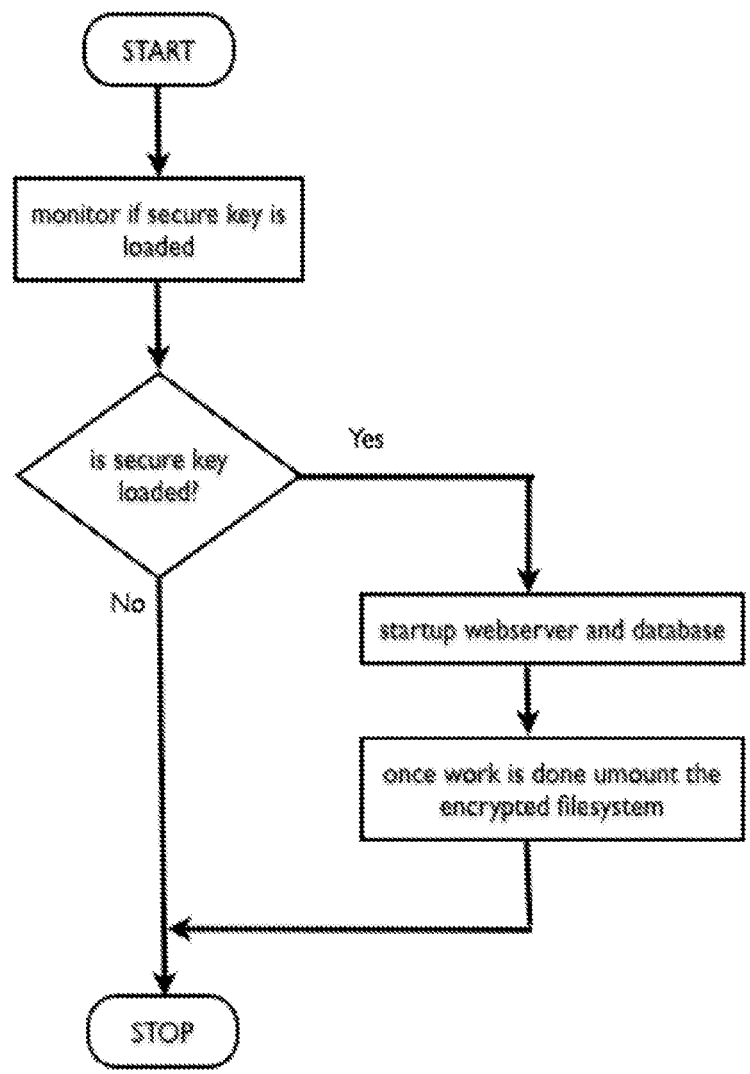
FIG. 4 is a flowchart depicting the secure plug server startup process.

FIG. 4 is a flowchart depicting the method of plug server startup, in this process on booting the plug server checks if the encrypting key file is loaded, if its loaded then the plug server proceeds to start the webserver and database server, if the key file is not loaded then the plug server cannot see the desired files to start the webserver and the database server which are need for the application to function and hence it will stop the boot process, making the plug usable.

It becomes very important to secure these externally mounted keys as they can be prone to many attacks, such as by cloning or copying the keys, so we lock the keys to the various hardware level attributes of the mounted device and also match the parent device attribute to that of the child device, which is unique to each external device this almost makes it impossible to replicated the exact key for starting the decryption process for the data at rest at the same time if another cloned copy of the key is used to start the plug server, it won't mount the encrypted disk, thus failing at boot time and making the plug unusable

REFERENCES

[1] Clemens Fruhwirth, "New Methods in Hard Disk Encryption": http://clemens.endorphin.org/cryptography
[2] Clemens Fruhwirth, "LUKS On-Disk Format Specification": http://luks. endorphin. org/LUKS-on-disk-format.pdf
[3] LUKS Software: https://code.google.com/p/cryptsetup/
[4] RFC 2898, "PKCS #5: Password-Based Cryptography Specification Version 2.0": http://rfc. net/rfc2898.html
[5] Moses Liskov, Ronald L. Rivest and David Wagner, "Tweakable Block Ciphers": http://www. cs. berkeley.edu/~daw/papers/tweak-crypto02.pdf
[7] IEEE, "Draft Proposal for Tweakable Narrow-block Encryption": http://www. siswg. org/docs/LRW-AES-10-19-2004.pdf
U.S. Pat. No. 8,559,630

PATENT CITATIONS

| Cited patent | Filing Date | Publication Date | Applicant | Title |
|---|---|---|---|---|
| US8189769 | Oct. 31, 2007 | May 29, 2012 | Apple Inc. | Systems and methods for encrypting data |
| US8559630 | Apr. 27, 2012 | Oct. 15, 2013 | Apple Inc. | Systems and methods for encrypting data |
| WO2014042512 A1 | Sep. 5, 2013 | Mar. 20, 2014 | Mimos Berhad | Management of storage encryption over network-based elastic block store volume |
| US20070011469 A1 | Sep. 16, 2005 | Jan. 11, 2007 | Gary G. Allison | Secure local storage of files |

The invention claimed is:

1. A method for locking and unlocking an eMMC flash disk by using a physical USB device with a plug server, wherein the internet is not available to the plug server, comprising the steps of:
   mounting the USB device to the plug server via a serial port connector, wherein the serial port connector is attached to the plug server;
   powering on the plug server to start the boot sequence on the USB device, wherein the boot sequence mounts the plug server as an external device to the USB device, mounts a partition, and uses a key file to decrypt the partition;
   obtaining a user password to generate a key, wherein the key is transferred to the USB device to save as the key file;
   creating the partition on the eMMC flash disk, wherein the partition is initialized by using a block level device encryption algorithm and the key, formatted by allocating zeros, and is mounted to a local directory on the plug server;
   creating one or more key slots in the partition, wherein the key is put into the first of the key slots;
   obtaining parent hardware attributes from the plug server, wherein the attributes are coupled with the key in the key slot;
   obtaining child hardware attributes from the USB device, wherein the attributes are coupled with the key in the key slot;
   locating a root file system on the eMMC flash disk, wherein the root file system contains web server files, database files, and application data files;
   moving the web server files, the database files, and the application data files into the mounted local directory, wherein the files are removed from the root file system;
   swapping out the eMMC flash disk from the plug server;
   for each first key slot of the key slots, determining if the first key slot contains the key that match the key file, determining if the key is coupled with the parent hardware attributes, and determining if the key is coupled with the child hardware attributes; and
   for each of the first key slots that contains the key that matches the key file, is coupled with the parent hardware attributes, and is coupled with the child hardware attributes, starting an web server instance, a database instance, and an application instance, wherein the web server instance, the database instance, and the application instance are uniquely identified by the combination of the hardware attributes of the plug server and the hardware attributes of the USB device.

2. A method for operating a plug server by using a physical USB device for unlocking the server, the method comprising:
   mounting a physical USB device to the plug server via a serial port connector, wherein the serial port connector is attached to the plug server;
   swapping an eMMC flash disk into the plug server, wherein the eMMC flash disk contains an encrypted partition, one or more key slots, web server files, database files, and application data files;
   powering on the plug server by using at least one solar battery pack to start the boot sequence on the USB device, wherein the USB device contains a boot sequence and a key file, wherein the boot sequence mounts the partition and uses the key file to decrypt the mounted partition;
   connecting a mobile device in close proximity to the plug server via a WIFI access point;
   for each of the key slots, determining if the key slot contains a key that match the key file on the USB device, determining if the key is coupled with parent hardware attributes that match the attributes of the plug server, and determining if the key is coupled with child hardware attributes that match the attributes of the USB device;
   for each key slot that contains a matching key, matching parent hardware attributes, and matching child hardware attributes, starting an web server instance, a database instance, and an application instance, wherein the web server instance, the database instance, and the application instance are uniquely identified by the combination of the plug server attributes and the USB device attributes, wherein the mobile device uses the application instance for reading via decryption provided by the plug server, and the mobile device uses the application instance for writing via encryption provided the plug server.

3. A computer system for at least one network connected mobile devices without internet to interact with an installed application, the computer system comprising:

a plug server, wherein the plug server is powered by at least one solar battery pack;
an eMMC flash disk containing an encrypted partition, wherein the partition has at least one key slot, web server files, database files, and application data files;
a first physical USB device externally mounted to the plug server, wherein the USB device contains a first key file and a boot sequence;
a second physical USB device externally mounted to the plug server, wherein the USB device contains a second key file and a boot sequence;
a first key slot in the encrypted partition, wherein the key slot contains a key matching to the first key file, and the key is coupled with parent hardware attributes matching to the attributes of the plug server, and the key is coupled with child hardware attributes matching to the attributes of the first USB device;
a second key slot in the encrypted partition, wherein the key slot contains a key matching to the second key file, and the key is coupled with parent hardware attributes matching to the attributes of the plug server, and the key is coupled with child hardware attributes matching to the attributes of the second USB device;
a WIFI access point attached to the plug server, wherein the WIFI access point connects mobile devices in close proximity to the plug server;
a first mobile device, wherein the mobile device connects to the plug server via the WIFI access point; and
a second mobile device, wherein the mobile device connects to the plug server via the WIFI access point, wherein:
the eMMC flash disk is swapped into the plug server;
the plug server is powered on by using at least one of the solar battery packs;
the plug server runs the boot sequence on the first physical USB device to mount the encrypted partition, to start a first web server instance, to start a first database instance, and to start a first application instance with data, wherein the first web server instance, the first database instance, and the first application instance are uniquely identified by combination of hardware attributes of the plug server and hardware attributes of the first USB device;
the plug server runs the boot sequence on the second USB device to mount the encrypted partition, to start a second web server instance, to start a second database instance, and to start a second application instance with data, wherein the second web server instance, the second database instance, and the second application instance are uniquely identified by combination of hardware attributes of the plug server and hardware attributes of the second USB device;
the first mobile device identifies the first application on the plug server for reading and writing, wherein the first application is uniquely identified by the combination of hardware attributes of the plug server and of the first USB device;
the second mobile device identifies the second application on the plug server for reading and writing, wherein the second application is uniquely identified by the combination of hardware attributes of the plug server and of the second USB device;
the plug server transparently decrypts the reading for both the first mobile device and the second mobile device; and
the plug server transparently encrypts the writing for both the first mobile device and the second mobile device.

* * * * *